United States Patent
Van Thiel

(10) Patent No.: US 11,945,420 B2
(45) Date of Patent: Apr. 2, 2024

(54) ELECTRO-PNEUMATIC TWO-CHANNEL AXLE MODULATOR

(71) Applicant: WABCO GmbH, Hannover (DE)

(72) Inventor: Julian Van Thiel, Großburgwedel (DE)

(73) Assignee: ZF CV Systems Europe BV, Brussels (BE)

( * ) Notice: Subject to any disclaimer, the term of this patent is extended or adjusted under 35 U.S.C. 154(b) by 848 days.

(21) Appl. No.: 16/982,726

(22) PCT Filed: Mar. 22, 2019

(86) PCT No.: PCT/EP2019/057315
§ 371 (c)(1),
(2) Date: Sep. 21, 2020

(87) PCT Pub. No.: WO2019/192861
PCT Pub. Date: Oct. 10, 2019

(65) Prior Publication Data
US 2021/0001828 A1 Jan. 7, 2021

(30) Foreign Application Priority Data

Apr. 5, 2018 (DE) .................... 10 2018 108 092.1

(51) Int. Cl.
*B60T 13/68* (2006.01)
*B60T 13/66* (2006.01)
(Continued)

(52) U.S. Cl.
CPC .......... *B60T 13/683* (2013.01); *B60T 13/662* (2013.01); *B60T 7/042* (2013.01); *B60T 8/3675* (2013.01);
(Continued)

(58) Field of Classification Search
CPC ............................ B60T 13/683; B60T 13/662
(Continued)

(56) References Cited

U.S. PATENT DOCUMENTS

| | | | |
|---|---|---|---|
| 6,626,505 B2 * | 9/2003 | Frank | B60T 8/5081 303/118.1 |
| 2013/0320751 A1 * | 12/2013 | Eberling | B60T 13/662 303/14 |

FOREIGN PATENT DOCUMENTS

| | | |
|---|---|---|
| DE | 3545021 A1 | 6/1987 |
| DE | 10036287 A1 | 2/2002 |

(Continued)

OTHER PUBLICATIONS

European Patent Office, Rijswijk, Netherlands, International Search Report of International Application No. PCT/EP2019/057315, dated Aug. 13, 2019, 2 pages.

*Primary Examiner* — Peter D Nolan
*Assistant Examiner* — Luke Huynh
(74) *Attorney, Agent, or Firm* — Dickinson Wright PLLC

(57) ABSTRACT

An electro-pneumatic two-channel axle modulator (1) for utility vehicles has a first supply port (2) for connecting a first compressed air supply (3) and a second supply port (4) for connecting a second compressed air supply (5), a front axle channel port (6), a rear axle channel port (8), an electro-pneumatic front axle valve assembly (10) connected to the first supply port (2) for controlling a front axle brake pressure (pVA) at the front axle channel port (6), and an electro-pneumatic rear axle valve assembly (12) connected to the second supply port (4) for controlling a rear axle brake pressure (pHA) at the rear axle channel port (8). A first redundancy valve assembly (14) is connected to the second supply port (4) for controlling a redundant front axle brake pressure (pVAR) at the front axle channel port (6).

25 Claims, 6 Drawing Sheets

(51) Int. Cl.
B60T 7/04 (2006.01)
B60T 8/36 (2006.01)
B60T 17/22 (2006.01)

(52) U.S. Cl.
CPC ....... *B60T 17/221* (2013.01); *B60T 2270/413* (2013.01)

(58) Field of Classification Search
USPC .......................................................... 701/70
See application file for complete search history.

(56) References Cited

FOREIGN PATENT DOCUMENTS

| | | | | |
|---|---|---|---|---|
| DE | 102007051151 A1 * | 11/2008 | ............ | B60T 13/683 |
| DE | 102008014458 A1 | 9/2009 | | |
| EP | 1069015 A2 | 1/2001 | | |
| EP | 1122142 A1 | 8/2001 | | |
| WO | 2010094481 A2 | 8/2010 | | |
| WO | WO-2010094481 A2 * | 8/2010 | ............ | B60T 13/683 |

\* cited by examiner

ELECTRO-PNEUMATIC TWO-CHANNEL AXLE MODULATOR

TECHNICAL FIELD

The invention relates to a two-channel axle modulator for utility vehicles, having a first supply port for connecting a first compressed air supply and a second supply port for connecting a second compressed air supply, a front axle channel port, a rear axle channel port, an electro-pneumatic front axle valve assembly which is connected to the first supply port for controlling a front axle brake pressure at the front axle channel port, and an electro-pneumatic rear axle valve assembly which is connected to the second supply port for controlling a rear axle brake pressure at the rear axle channel port.

BACKGROUND

Two-channel axle modulators of the type mentioned at the beginning are used in utility vehicles to convert a brake demand into brake pressures for two axles, in particular the front axle and the rear axle or rear axles. The brake pressures for the front and rear axle are frequently different in order to achieve stable braking of the vehicle. If both the front axle and the rear axle are fed from a common pneumatic circuit, there is the risk that the vehicle can no longer be braked if there is a simple fault in the brake system. For this purpose, it is known in the prior art to design the service brake with two circuits. In general, a front axle brake circuit and a rear axle brake circuit are thereby provided. In the event of a fault in one of the circuits, sufficient deceleration can thus still be controlled via the respective other brake circuit. From WO 2010/094481 A2 there is known an electro-pneumatic pressure regulation module comprising pressure regulation channels having separate pneumatic circuits, in which two completely separate pneumatic circuits are used for the front axle and the rear axle. For this purpose, at least one dedicated supply pressure port which can be connected to a dedicated compressed air supply is associated with each pressure regulation channel, wherein the pneumatic flow paths of each pressure regulation channel are formed so as to be pneumatically separate, at least starting from the respective supply pressure port as far as the respective working pressure port, from the pneumatic flow paths of a respective other pressure regulation channel. In this manner, two completely independent pressure regulation circuits are to be obtained, so that, for example in the event of failure of the first pressure regulation circuit, the second regulation circuit can still correctly brake the axle associated therewith.

A disadvantage here is that, in the event of failure of a supply pressure, it is also no longer possible to use the pneumatic redundant pressure for controlling the pressure of the respective channel.

SUMMARY

Accordingly, the object of the present invention is to provide an electro-pneumatic two-channel axle modulator for utility vehicles which permits redundant control and is preferably optimized in terms of installation space.

This object is achieved in an electro-pneumatic two-channel axle modulator of the type mentioned at the beginning in that there is provided a first redundancy valve assembly which is connected to the second supply port for controlling a redundant front axle brake pressure at the front axle channel port. The first redundancy valve assembly is connected according to the invention to the second supply port, which in normal operation serves to control the rear axle brake pressure at the rear axle channel port. In other words, according to the invention, the supply pressure which is provided for the rear axle in normal operation is used in the case of redundancy to control the redundant front axle brake pressure at the front axle channel port. The invention accordingly moves away from complete separation of the front axle circuit and the rear axle circuit, as is proposed in the prior art. The inventors of the present invention have found that, although good safety can be achieved by completely separating the front axle and rear axle circuits, the principle must be set aside in order at the same time to achieve redundant control of the respective failed axle. In particular, particularly advantageous redundant control can be achieved if the supply ports are connected crosswise.

To that effect it is preferred to provide a second redundancy valve assembly which is connected to the first supply port for controlling a redundant rear axle brake pressure at the rear axle channel port. Thus, while the first supply port serves in normal operation to control the front axle brake pressure and the second supply port serves in normal operation to control the rear axle brake pressure, this allocation is reversed in the case of redundancy. In other words, in the case of redundancy, the second supply port is used for controlling the redundant front axle brake pressure and the first supply port is used for controlling a redundant rear axle brake pressure.

It is thus possible, in the event that, for example, the first circuit fed by the first supply port fails, to control the front axle brake pressure redundantly via by means of the pressure provided by the second supply port for the second circuit. In an identical manner, in the event of failure of the second circuit fed by the second supply port, the rear axle brake pressure can be redundantly controlled by using the supply pressure provided at the first supply port.

In this manner, a complete crosswise connection of the supply ports is achieved, and the pneumatic circuits for the front and the rear axle are connected completely crosswise.

In a preferred further development, the electro-pneumatic two-channel axle modulator has a first redundancy port for receiving a first redundancy pressure which is connected at least to the first redundancy valve assembly. The first redundancy port can additionally also be connected to the second redundancy valve assembly. In the latter case, the first redundancy pressure provided at the redundancy port is divided between both the first and the second redundancy valve assembly and then controlled as redundant front axle brake pressure or redundant rear axle brake pressure according to which of the circuits has failed.

The first redundancy pressure is preferably provided by a pneumatic brake value transmitter, in particular a pneumatic brake pedal. If this pneumatic brake pedal has only a single pneumatic port, that port is preferably connected to the first redundancy port, which in this case can then be the only redundancy port.

Depending on the configuration, it can also be advantageous that the electro-pneumatic two-channel axle modulator has a second redundancy port for receiving a second redundancy pressure. The second redundancy port is then connected to the second redundancy valve assembly. In this case, the two redundancy ports, the first redundancy port and the second redundancy port, are separate from one another, and the first redundancy pressure and the second redundancy pressure are controlled separately. The redundant front axle brake pressure can then be controlled via the first redundancy pressure, while the redundant rear axle brake pressure can be controlled via the second redundancy pressure.

According to a further preferred embodiment, the electro-pneumatic front axle valve assembly has a front axle pilot unit having a front axle inlet valve for controlling a first front axle control pressure, and a front axle outlet valve, and the electro-pneumatic rear axle valve assembly has a rear axle pilot unit having a rear axle inlet valve for controlling a first rear axle control pressure, and a rear axle outlet valve. The front axle pilot unit can additionally preferably control a second front axle control pressure, and the rear axle pilot unit can preferably control a second rear axle control pressure. The first and second front axle control pressures and first and second rear axle control pressures are preferably controlled according to the pneumatic valves, which can then be connected to the front axle channel port and the rear axle channel port for the admission of air thereto and the venting thereof.

It is further preferred that the first redundancy valve assembly has a first electro-pneumatic redundancy valve connected to the first redundancy port, and a first redundancy relay valve. The first electro-pneumatic redundancy valve is preferably closed in an energized state and open in a currentless state, so that the first redundancy pressure can be fed through the first electro-pneumatic redundancy valve. The first electro-pneumatic redundancy valve thus serves to lock out the first redundancy pressure in normal operation. In the event of a fault, the first electro-pneumatic redundancy valve is preferably switched currentless, so that the first redundancy pressure can be fed through. The first redundancy relay valve preferably serves to control the redundant front axle brake pressure. A relay valve is generally controlled pneumatically, so that it is operable even in the currentless state. In this embodiment, it is further advantageous that a separate relay valve is used as the first redundancy relay valve, which in this case is used solely for controlling the redundant front axle brake pressure, so that the first redundancy relay valve can be configured simply and inexpensively. It is not necessary for this valve to be able to withstand a plurality of switching cycles.

In the event that the electro-pneumatic two-channel axle modulator has a second redundancy valve assembly, the second redundancy valve assembly preferably has a second redundancy relay valve. The second redundancy relay valve is then preferably used to control the redundant rear axle brake pressure. The first and the second redundancy relay valve can be identical, and in particular inexpensive and simple, in construction.

It is further provided, preferably for the case where a second redundancy port is present, that the second redundancy valve assembly has a second electro-pneumatic redundancy valve connected to the second redundancy port. The second electro-pneumatic redundancy valve then serves to lock out the second redundancy pressure and optionally, in the event of a fault, to feed it through to the second redundancy relay valve. If only one redundancy port is provided, the redundancy pressure present there is preferably transmitted both to the first redundancy relay valve and to the second redundancy relay valve.

It is preferred that the first redundancy relay valve has a redundancy relay valve supply port connected to the second supply port, a first redundancy relay valve venting port connected to a vent, a first redundancy relay valve working port connectable to the front axle channel port, and a first redundancy relay valve control port connected to the first electro-pneumatic redundancy valve.

The term "connectable" means in the present context that a further valve may be provided between the front axle channel port and the first redundancy relay valve working port, so that, when this further valve is closed, the front axle channel port and the first redundancy relay valve working port are separated.

In a corresponding manner, it is preferably provided that the second redundancy relay valve has a second redundancy relay valve supply port connected to the first supply port, a second redundancy relay valve venting port connected to a vent, a second redundancy relay valve working port connectable to the rear axle channel port, and a second redundancy relay valve control port connected to the first electro-pneumatic redundancy valve or the second electro-pneumatic redundancy valve. In the event that the electro-pneumatic two-channel axle modulator has only a first redundancy port and consequently has only a first electro-pneumatic redundancy valve, the second redundancy relay valve control port is connected thereto. In this embodiment, it can also be provided that only a single redundancy port is provided, to which there are then connected, however, both a first and a second electro-pneumatic redundancy valve. In this case, it is then preferred that the second redundancy relay valve control port is connected to the second electro-pneumatic redundancy valve.

In order to convert the control pressures of the front axle pilot unit and the rear axle pilot unit, it is preferably provided that the electro-pneumatic front axle valve assembly has a pneumatic front axle main valve assembly which is connected to the first supply port and which receives the first front axle control pressure and is configured, on the basis of the received first front axle control pressure, to control the front axle brake pressure at the front axle channel port. Furthermore, the electro-pneumatic rear axle valve assembly preferably has a pneumatic rear axle main valve assembly which is connected to the second supply port and which receives the first rear axle control pressure and is configured, on the basis of the received first rear axle control pressure, to control the rear axle brake pressure at the rear axle channel port. In other words, in normal operation, that is to say not in the case of redundancy, the front axle brake pressure and the rear axle brake pressure are controlled via the first front axle control pressure and the first rear axle control pressure.

It is thereby particularly advantageous if the front axle main valve assembly is connected to the first redundancy relay valve for venting the front axle channel port. In other words, the first redundancy relay valve is preferably used both in normal operation and in redundancy operation for venting the front axle channel port. In other words, a venting path for the front axle channel port is also used for controlling (admitting air to) the redundant front axle brake pressure. This is advantageous because valves are usually so designed that they vent the front axle channel port in the case of redundancy in order not to automatically control a brake pressure in the case of redundancy but to free the front axle channel port. The front axle channel port, which is then open, can advantageously be used to control the redundant front axle brake pressure via the first redundancy relay valve.

In a corresponding manner, it is preferably further provided that the rear axle main valve assembly is connected to the second redundancy relay valve for venting the rear axle channel port. The second redundancy relay valve is accordingly preferably used both in normal operation and in redundancy operation for venting the rear axle channel port.

For the rest, the statements made above in connection with the front axle channel port here apply correspondingly.

For the respective admission of air to and venting of the front axle channel port in normal operation, the pneumatic front axle main valve assembly preferably has a front axle air admission main valve connected to the first supply port and the front axle channel port, and a front axle venting main valve connectable or connected to a vent or the vent and connected to the front axle channel port. In this case, separate valves are thus provided for admitting air to and venting the front axle channel port. It can also be provided in embodiments that a common air admission/venting main valve is provided. Both the front axle air admission main valve and the front axle venting main valve are in this case pneumatically switchable. The front axle air admission main valve receives the first front axle control pressure, and the front axle venting main valve preferably receives a second front axle control pressure.

In a corresponding manner, the pneumatic rear axle main valve assembly has a rear axle air admission main valve connected to the second supply port and the rear axle channel port, and a rear axle venting main valve connected or connectable to a vent or the vent and connected to the rear axle channel port. Both the rear axle air admission main valve and the rear axle venting main valve are pneumatically switchable. The rear axle air admission main valve receives the first rear axle control pressure, and the rear axle venting main valve receives a second rear axle control pressure. In specific embodiments, it can also be provided that the rear axle air admission main valve and the rear axle venting main valve are integrated into a single air admission/venting main valve.

It has already been stated above that it is advantageous to use the venting paths of the corresponding front axle and rear axle ports for controlling the redundant front axle brake pressure and the redundant rear axle brake pressure. To that effect, it is preferred that the front axle venting main valve is connected to the first redundancy relay valve working port. In a corresponding manner, the rear axle venting main valve is preferably connected to the second redundancy relay valve working port. If the front axle venting main valve and the rear axle venting main valve are open, the redundant front axle brake pressure and the redundant rear axle brake pressure can then be controlled in this embodiment via the first and second redundancy relay valve, respectively.

In a variant of the electro-pneumatic two-channel axle modulator, the pneumatic front axle main valve assembly has a front axle relay valve, and the pneumatic rear axle main valve assembly has a rear axle relay valve. In this exemplary embodiment, the pneumatic front axle main valve assembly and the pneumatic rear axle main valve assembly do not have separately switched main valves, as described hereinbefore, but relay valves, as have already also been used in the prior art.

The front axle relay valve has a front axle relay valve supply port connected to the first supply port, a front axle relay valve venting port connected to the first redundancy relay valve working port, a front axle relay valve working port connected to the front axle channel port, and a front axle relay valve control port connected to the front axle pilot unit.

In a corresponding manner, the rear axle relay valve has a rear axle relay valve supply port connected to the second supply port, a rear axle relay valve venting port connected to the second redundancy relay valve working port, a rear axle relay valve working port connected to the rear axle channel port, and a rear axle relay valve control port connected to the rear axle pilot unit.

The first electro-pneumatic redundancy valve is preferably configured as an electrically switchable 3/2-way valve. It preferably has a first redundancy valve port connected to the first redundancy port, a second redundancy valve port connected to the first redundancy relay valve control port, and a third redundancy valve port connected to a vent or the vent. Via the redundancy valve, the redundancy pressure can thus be controlled directly at the redundancy relay valve control port, in order to control the redundant front axle brake pressure via that port.

In a variant, the second redundancy valve port is further also connected to the second redundancy relay valve control port. This is preferably the case when the electro-pneumatic two-channel axle modulator has only a first redundancy port.

If, however, the electro-pneumatic two-channel axle modulator has a second redundancy port and if a second electro-pneumatic redundancy valve is accordingly provided, that redundancy valve preferably has a fourth redundancy valve port connected to the second redundancy port, a fifth redundancy valve port connected to the second redundancy relay valve control port, and a sixth redundancy valve port connected or connectable to a vent or the vent. The second electro-pneumatic redundancy valve is therefore preferably also configured as an electrically switchable 3/2-way valve.

It is further preferred that the electro-pneumatic two-channel axle modulator has an electrical control unit having an electrical terminal for receiving brake signals and for providing corresponding switching signals at least to the electro-pneumatic front axle valve assembly and the electro-pneumatic rear axle valve assembly. Via the electrical terminal, brake signals can be provided, for example, to brake value transmitters or an additional central module. Those signals are then converted by the electrical control unit into corresponding switching signals at least for the electro-pneumatic front axle valve assembly and the electro-pneumatic rear axle valve assembly.

It is further provided that the electro-pneumatic two-channel axle modulator has a first pressure sensor which is provided for detecting the front axle brake pressure and providing a corresponding front axle pressure signal. The electro-pneumatic two-channel axle modulator further has a second pressure sensor which is provided for detecting the rear axle brake pressure and providing a corresponding rear axle pressure signal. On the basis of these signals, the electronic control unit can provide corresponding switching signals or send signals to a central module.

Embodiments of the invention will now be described hereinbelow by means of the drawings. The drawings are not necessarily intended to represent the embodiments to scale but rather, where this is advantageous for the explanation, are in schematic and/or slightly distorted form. With regard to supplements to the teaching which can be derived directly from the drawings, reference is made to the relevant prior art. It should thereby be noted that various modifications and changes concerning the form and the detail of an embodiment may be made without departing from the general idea of the invention. The features of the invention that are disclosed in the description, in the drawings and in the claims can be fundamental to the further development of the invention both individually and in any desired combination. In addition, any combinations of at least two of the features disclosed in the description, the drawings and/or the claims fall within the scope of the invention. The general idea of the invention is not limited to the exact form or the detail of the preferred embodiments shown and described hereinbelow nor is it limited to subject-matter which would be limited in comparison with the subject-matter claimed in the claims. Where ranges of dimensions are given, values lying within the mentioned limits are also to be disclosed as limit values and can be used and claimed as desired. For the sake of simplicity, the same reference numerals are used hereinbelow for identical or similar parts or parts having an identical or similar function.

Further advantages, features and details of the invention will become apparent from the following description of the preferred embodiments and with reference to the drawings.

DETAILED DESCRIPTION OF THE DRAWINGS

Figure 1:
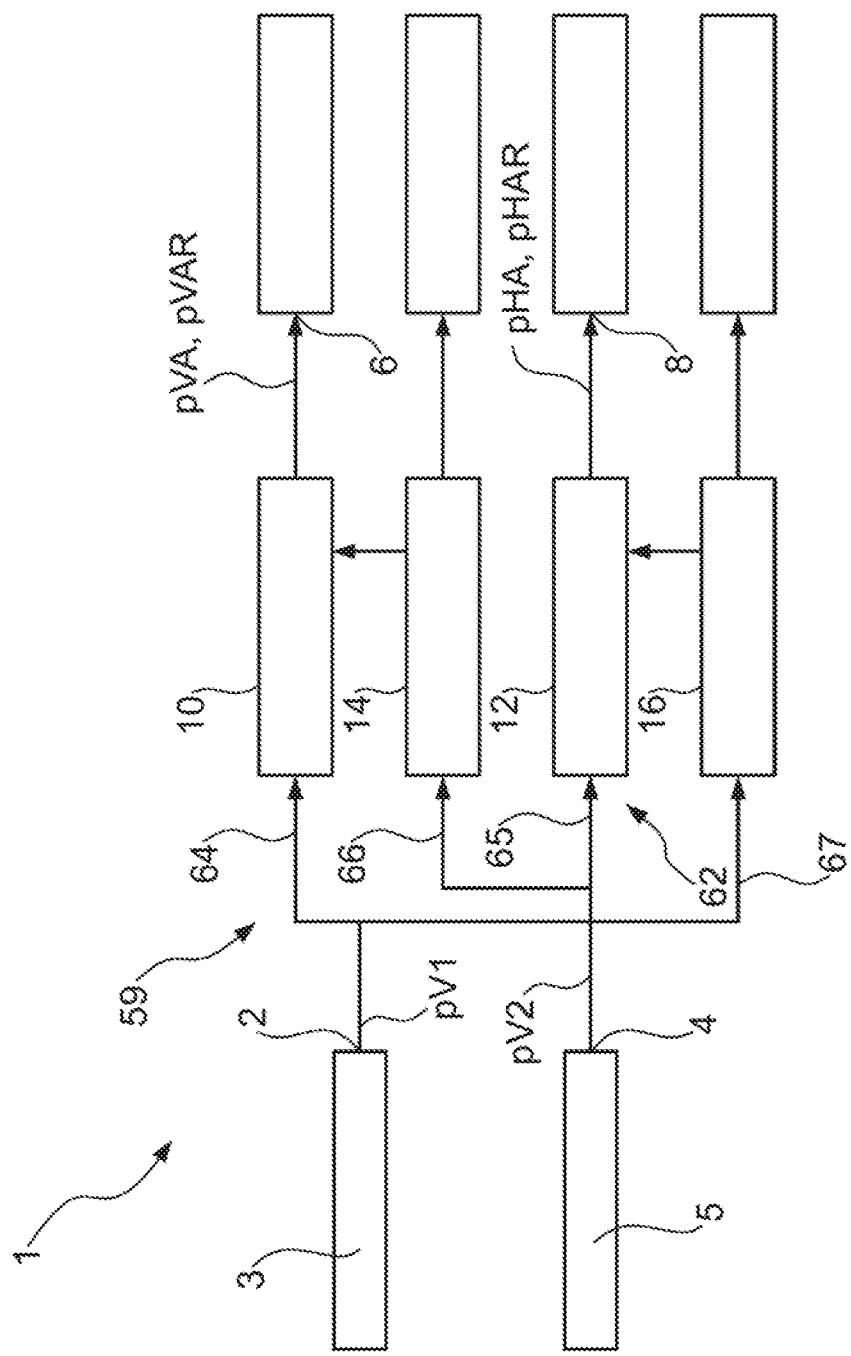
FIG. 1 shows a schematic overview of the electro-pneumatic two-channel axle modulator.

FIG. 1 shows first of all a general overview of the electro-pneumatic two-channel axle modulator 1. Such an electro-pneumatic two-channel axle modulator 1 is used to control two different brake pressures, for example for a front axle and a rear axle, from a brake demand signal SB via two different channels.

In the fundamental construction of the electro-pneumatic two-channel axle modulator 1 shown, it has a first supply port 2, to which a first compressed air supply 3 is connected and provides a first supply pressure pV1. The electro-pneumatic two-channel axle modulator 1 additionally has a second supply port 4, to which a second compressed air supply 5 is connected and provides a second supply pressure pV2. Via the first supply port 2, a first pneumatic circuit 59 which is associated with a front axle channel port 6 is fed. Via the second supply port 4, a second pneumatic circuit 62 which is associated with a rear axle channel port 8 is fed.

In order to convert a brake signal into a corresponding front axle brake pressure pVA at the front axle channel port 6, the electro-pneumatic two-channel axle modulator 1 has a front axle valve assembly 10. The front axle valve assembly 10 is connected via a first pneumatic line 64 to the first supply port 2. In a corresponding manner, the electro-pneumatic two-channel axle modulator 1 has a rear axle valve assembly 12 which is connected via a second pneumatic line 65 to the second supply port 4 and serves to control a rear axle brake pressure pHA at the rear axle channel port 8 from the second supply pressure pV2, which is provided at the second supply port 4.

It will be understood that the terms "front axle channel port" and "rear axle channel port" are here only exemplary and can also in principle be understood as being a first axle channel port and a second axle channel port if other axles are to be controlled thereby. The terms "front axle channel port" and "rear axle channel port" here serve primarily to distinguish between the two channels in a simple manner.

In order to control a redundant front axle brake pressure pVAR at the front axle channel port 6 in the event of failure of the first circuit 59, for example, the electro-pneumatic two-channel axle modulator 1 has a first redundancy valve assembly 14. However, the first redundancy valve assembly 14 is connected not to the first supply port 2 but, via a third pneumatic line 66, to the second supply port 4. In other words, the first redundancy valve assembly 14 is fed by the second pneumatic circuit 62. In the configuration shown in FIG. 1, the first redundancy valve assembly 14 is first connected to the front axle valve assembly 10; in other embodiments, the first redundancy valve assembly 14 can also be connected directly to the front axle channel port 6.

In a corresponding manner, the electro-pneumatic two-channel axle modulator 1 has a second redundancy valve assembly 16 which is connected via a fourth pneumatic line 66 to the first supply port 2 and via which a redundant rear axle brake pressure pHAR can then be controlled at the rear axle channel port 8.

Figure 2:
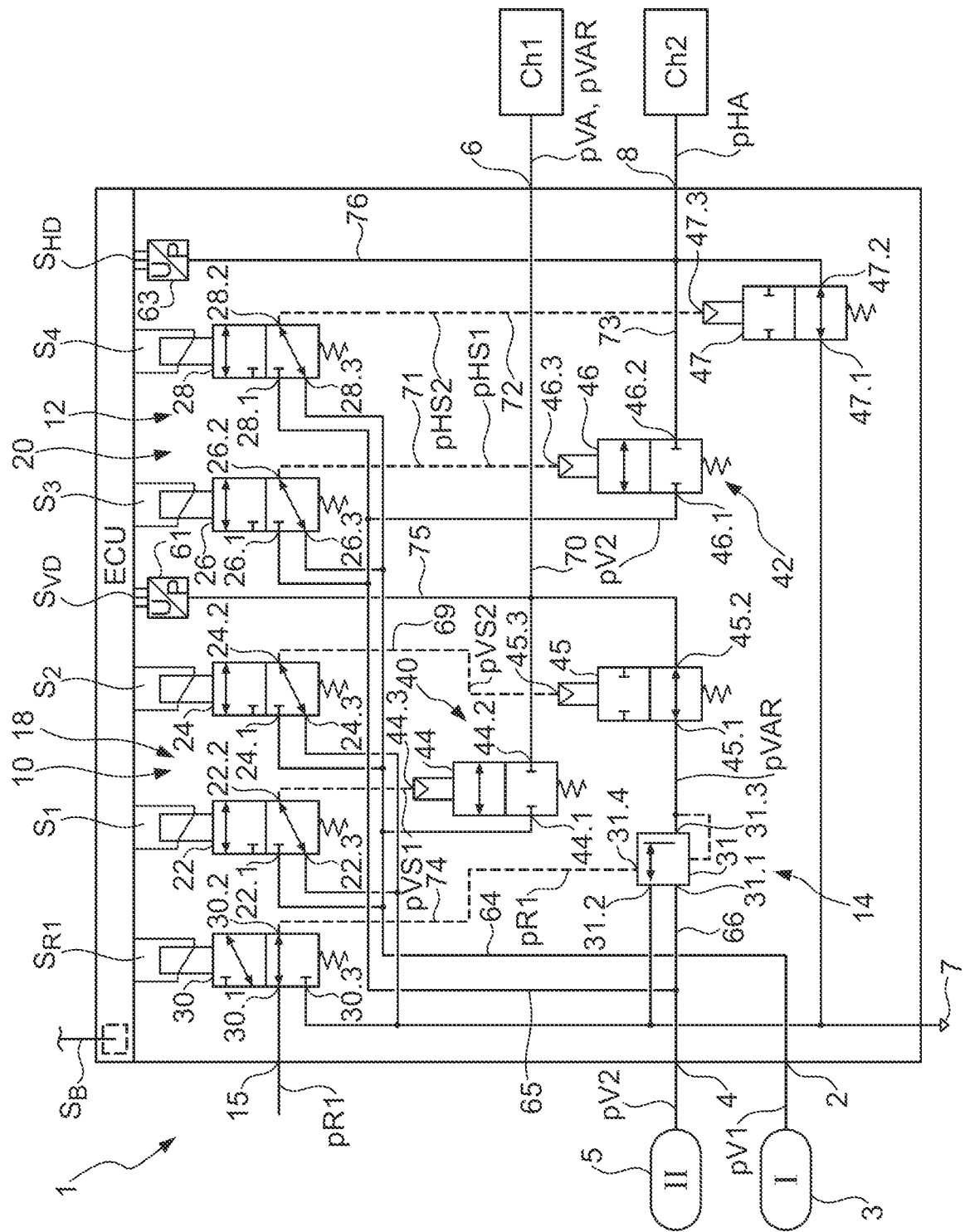
FIG. 2 shows a first exemplary embodiment of the electro-pneumatic two-channel axle modulator.

FIG. 2 shows a first exemplary embodiment and a possible implementation of the electro-pneumatic two-channel axle modulator of FIG. 1.

The electro-pneumatic two-channel axle modulator 1 according to this first exemplary embodiment (FIG. 2) again has a first supply port 2 which is connected to the first compressed air supply 3. It further has a second supply port 4 which is connected to a second compressed air supply 5. At a front axle channel port 6, the front axle brake pressure pVA is controlled, and at the rear axle channel port 8, the rear axle brake pressure pHA is controlled. For controlling the front axle brake pressure pVA, the electro-pneumatic two-channel axle modulator 1 has the front axle valve assembly 10, and for controlling the rear axle brake pressure pHA, the electro-pneumatic two-channel axle modulator 1 has the rear axle valve assembly 12. Both the front axle valve assembly 10 and the rear axle valve assembly 12 are configured electro-pneumatically.

For controlling the redundant front axle brake pressure pVAR, the electro-pneumatic two-channel axle modulator 1 has the first redundancy valve assembly 14. A redundant control of a rear axle brake pressure is not provided in this first exemplary embodiment (FIG. 2), and in this respect the electro-pneumatic two-channel axle modulator 1 according to this first exemplary embodiment (FIG. 2) does not have a second redundancy valve assembly 16 (see e.g. FIGS. 1 and 3). In this respect, the front axle valve assembly 10 is connected via the first pneumatic line 64 to the first supply port 2, and the rear axle valve assembly 12 is connected via the second pneumatic line 65 to the second supply port 4. Furthermore, the first redundancy valve assembly 14 is connected via the third pneumatic line 66 to the second supply port 4.

The front axle valve assembly 10 in this exemplary embodiment has a front axle pilot unit 18 which is configured electro-pneumatically. In the same manner, the rear axle valve assembly 12 has a rear axle pilot unit 20.

The front axle pilot unit 18 has a front axle inlet valve 22 and a front axle outlet valve 24. The front axle inlet valve 22 is configured as an electrically switchable 3/2-way valve and receives a first switching signal S1 from an electronic control unit ECU.

The front axle inlet valve 22 has a first front axle inlet valve port 22.1, a second front axle inlet valve port 22.2 and a third front axle inlet valve port 22.3. The first front axle inlet valve port 22.1 is connected to the first pneumatic line 64 and thus receives the first supply pressure pV1. The third front axle inlet valve port 22.3 is connected to a vent 7. The second front axle inlet valve port 22.2 is connected to a first control line 68 into which the front axle inlet valve 22 controls a first front axle control pressure pVS1. The front axle inlet valve 22 is preferably in the currentless state in the first switching position shown in FIG. 2, in which the third front axle inlet valve port 22.3 is connected to the second front axle inlet valve port 22.2 and thus the first control line 68 is vented. In the second energized switching position not shown in FIG. 2, on the other hand, the first front axle inlet valve port 22.1 is connected to the second front axle inlet valve port 22.2, and the first front axle control pressure pVS1 is controlled in the first control line 68.

The front axle outlet valve 24 is likewise configured as an electrically switchable 3/2-way valve and receives a second switching signal S2. The front axle outlet valve 24 has a first front axle outlet valve port 24.1, a second front axle outlet valve port 24.2 and a third front axle outlet valve port 24.3. The first front axle outlet valve port 24.1 is connected to the first pneumatic line 64, and consequently the first supply pressure pV1 is controlled at that port. The second front axle outlet valve port 24.2 is connected to a second control line 69, into which a second front axle control pressure pVS2 is controlled. The third front axle outlet valve port 24.3 is connected to the vent 7. The front axle outlet valve 24 is preferably in the currentless state in the switching position shown in FIG. 2, in which the second front axle outlet valve port 24.2 is connected to the third front axle outlet valve port 24.3, the second control line 69 is thus vented. In the second switching position not shown in FIG. 2, the first front axle outlet valve port 24.1 is connected to the second front axle outlet valve port 24.2, and the second front axle control pressure pVS2 is controlled in the second control line 69.

In order to convert the first front axle control pressure pVS1 and the second front axle control pressure pVS2 into a corresponding front axle brake pressure pVA at the front axle channel port 6, the front axle valve assembly 10 further has a pneumatic front axle main valve assembly 40. This pneumatic front axle main valve assembly 40 has a front axle air admission main valve 44 and a front axle venting main valve 45. Both the front axle air admission main valve 44 and the front axle venting main valve 45 are configured as pneumatically switchable 3/2-way valves. In this respect, the front axle air admission main valve 44 has a first front axle air admission port 44.1, a second front axle air admission port 44.2 and a front axle air admission control port 44.3. The first front axle air admission port 44.1 is connected to the first pneumatic line 64, and in this respect the first supply pressure pV1 is controlled at that port. The second front axle air admission port 44.2 is connected to a front axle brake pressure line 70, which connects the second front axle air admission port 44.2 to the front axle channel port 6. The front axle air admission control port 44.3 is connected to the first control line 68, so that the first front axle control pressure pVS1 is controlled at that port. The front axle air admission main valve 44 is preferably, provided the first front axle control pressure pVS1 is below a predetermined threshold value, in the first closed switching position shown in FIG. 2, so that the first front axle air admission port 44.1 and the second front axle air admission port 44.2 are separate. As soon as the first front axle control pressure pVS1 exceeds a predetermined threshold value, the front axle air admission main valve 44 switches into the second switching position not shown in FIG. 2, and the first front axle air admission port 44.1 is pneumatically connected to the second front axle air admission port 44.2. Consequently, the front axle brake pressure pVA is controlled at the front axle channel port 6.

Similarly, the rear axle pilot unit 20 has a rear axle inlet valve 26 and a rear axle outlet valve 28. The rear axle inlet valve 26 preferably corresponds in its configuration to the front axle inlet valve 22, and the rear axle outlet valve 28 preferably corresponds in its configuration to the front axle outlet valve 24. In this respect, the rear axle inlet valve 26 and the rear axle outlet valve 28 are configured as electrically switchable 3/2-way valves, wherein the electrical control unit ECU provides a third switching signal S3 at the rear axle inlet valve 26 and a fourth switching signal S4 at the rear axle outlet valve 28.

The rear axle inlet valve has a first rear axle inlet valve port 26.1, a second rear axle inlet valve port 26.1 and a third rear axle inlet valve port 26.3. The first rear axle inlet valve port 26.1 is connected to the second pneumatic line 65, so that the second supply pressure pV2 is controlled at that port. The second rear axle inlet valve port 26.2 is connected to a third control line 71, so that the rear axle inlet valve 26 controls the first rear axle control pressure pHS1 into that third control line 71. The third rear axle inlet valve port 26.3 is connected to the vent 7. The rear axle inlet valve 26 is preferably so switched in the currentless switching position shown in FIG. 2 that the second rear axle inlet valve port 26.2 is connected to the third rear axle inlet valve port 26.3, the third control line 71 is thus vented. In the energized second switching position not shown in FIG. 2, the rear axle inlet valve 26 is so switched that the second rear axle inlet valve port 26.2 is connected to the first rear axle inlet valve port 26.1 and consequently the first rear axle control pressure pHS1 is controlled in the third control line 71.

The rear axle outlet valve 28 has a first rear axle outlet valve port 28.1, a second rear axle outlet valve port 28.2 and a third rear axle outlet valve port 28.3. The first rear axle outlet valve port 28.1 is connected to the second pneumatic line 65, so that the second supply pressure pV2 is present at that port. The second rear axle outlet valve port 28.2 is connected to a fourth pneumatic line 72, into which the rear axle outlet valve 28 controls a second rear axle control pressure pHS2. The third rear axle outlet valve port 28.3 is connected to the vent 7. In the currentless state, the rear axle outlet valve 28 is preferably in the first switching position shown in FIG. 2, in which the second rear axle outlet valve port 28.2 is connected to the third rear axle outlet valve port 28.3. In this currentless switching position, the third control line 72 is thus vented. In the second, energized switching position not shown in FIG. 2, the first rear axle outlet valve port 28.1 is connected to the second rear axle outlet valve port 28.2, and the second rear axle control pressure pHS1 is consequently controlled in the fourth control line 72.

As has already been described in a similar manner in relation to the front axle valve assembly 10, the rear axle valve assembly 12 also has a pneumatic rear axle main valve assembly 42 for converting the first and second rear axle control pressures pHS1, pHS2. The pneumatic rear axle main valve assembly 42 has a rear axle air admission main valve 46 and a rear axle venting main valve 47. Both the rear axle air admission main valve 46 and the rear axle venting main valve 47 are configured as pneumatically switchable 2/2-way valves and in this respect preferably have the same configuration as the front axle air admission main valve 44 and the front axle venting main valve 45.

The rear axle air admission main valve 46 has a first rear axle air admission port 46.1, a second rear axle air admission port 46.2 and a rear axle air admission control port 46.3. The first rear axle air admission port 46.1 is connected to the second pneumatic line 65, so that the second supply pressure pV2 is controlled at that port. The second rear axle air admission port 46.2 is connected to a rear axle brake pressure line 73 which connects the second rear axle air admission port 46.2 directly to the rear axle channel port 8. The rear axle air admission control port 46.3 is connected to the third control line 71, so that the first rear axle control pressure pHS1 is controlled at that port. Provided the first rear axle control pressure pHS1 is below a predetermined threshold value, the rear axle air admission main valve 46 is preferably in the closed first switching position shown in FIG. 2. As soon as the first rear axle control pressure pHS1 exceeds the predetermined threshold value, the rear axle air admission main valve 46 switches into the second open position not shown in FIG. 2, and the first rear axle air admission port 46.1 is connected in a pneumatically conducting manner to the second rear axle air admission port 46.2. Consequently, the rear axle brake pressure pHA is controlled at the rear axle channel port 8.

For venting the rear axle channel port 8, the rear axle venting main valve 47 is provided. This valve has a first rear axle venting port 47.1, a second rear axle venting port 47.2 and a rear axle venting control port 47.3. The first rear axle venting port 47.1 is connected to the vent 7, and the second rear axle venting port 47.2 is connected to the rear axle channel port 8, more precisely to the rear axle brake pressure line 73. The rear axle venting control port 47.3 is connected to the fourth control line 72, so that the second rear axle control pressure pHS2 is controlled at that port. The rear axle venting main valve 47 is preferably in the open first switching position shown in FIG. 2 in the pressureless state, so that in the pressureless state the rear axle channel port 8 is vented. As soon as the second rear axle control pressure pHS2 exceeds a predetermined threshold value, the rear axle venting main valve 47 switches into the second closed switching position not shown in FIG. 2.

In order also to be able to control the front axle brake pressure pVA redundantly if the first circuit 59 fails, for example because the first compressed air supply 3 is empty, the electro-pneumatic two-channel axle modulator has the first redundancy valve assembly 14 (in this case the only redundancy valve assembly). For this purpose, the electro-pneumatic two-channel modulator 1 is provided with a first redundancy port 15 (the only redundancy valve port in the exemplary embodiment according to FIG. 2), at which a first redundancy pressure pR1 (the only redundancy pressure in the exemplary embodiment according to FIG. 2) is controlled. This first redundancy pressure pR1 can be provided, for example, by a pneumatic brake value transmitter, such as, for example, a brake pedal.

In this exemplary embodiment, the first redundancy valve assembly 14 has a first electro-pneumatic redundancy valve 30 and a first redundancy relay valve 31. The first electro-pneumatic redundancy valve 30 serves as a pilot valve for the first redundancy relay valve 31. The first electro-pneumatic redundancy valve 30 has a first redundancy valve port 30.1, a second redundancy valve port 30.2 and a third redundancy valve port 30.3. The first redundancy valve port 30.1 is connected to the first redundancy port 15. The second redundancy valve port 30.2 is connected to a first redundancy control line 74, so that the first redundancy pressure pR1 can be controlled into the first redundancy control line 74. The third redundancy valve port 30.3 is connected to the vent 7. The first electro-pneumatic redundancy valve is configured as an electrically switchable 3/2-way valve and receives a first redundancy switching signal SR1. In the currentless state, the first electro-pneumatic redundancy valve 30 is preferably in the open switching position shown in FIG. 2, so that, in the currentless state, the first redundancy pressure pR1 can be fed through the first electro-pneumatic redundancy valve 30. In this first currentless switching position, the first redundancy valve port 30.1 is thus connected to the second redundancy valve port 30.2. In the energized second switching position not shown in FIG. 2, the second redundancy valve port 30.2 is preferably connected to the third redundancy valve port 30.3, so that the first redundancy control line 74 is vented.

The first redundancy relay valve 31 has a first redundancy relay valve supply port 31.1, a first redundancy relay valve venting port 31.2, a first redundancy relay valve working port 31.3 and a first redundancy relay valve control port 31.4. The first redundancy relay valve supply port 31.1 is connected to the third pneumatic line 66, so that the second supply pressure pV2 is controlled at that port. In other words, the first redundancy relay valve 31, which is used for controlling the redundant front axle brake pressure pVAR, is fed by the second compressed air supply 5, which is originally associated with the second pneumatic circuit 62.

The first redundancy relay valve venting port 31.2 is connected to the vent 7. The first redundancy relay valve working port 31.3 is connected to the front axle valve assembly 10, more precisely to the pneumatic front axle main valve assembly 40. The first redundancy relay valve control port 31.4, on the other hand, is connected to the first redundancy control line 74, so that the first redundancy pressure pR1 is controlled at that port. Depending on the level of the first redundancy pressure pR1, the first redundancy relay valve 31 then controls the redundant front axle brake pressure pVAR at the first redundancy relay valve working port 31.3. This functions without an electrical switching signal SR1, in other words in the currentless switching position of the first electro-pneumatic redundancy valve 30. In normal operation, the first redundancy switching signal SR1 is present, so that the first redundancy relay valve control port 31.4 is vented and the first redundancy relay valve working port 31.3 is thus also vented.

For this reason it is possible to use the first redundancy relay valve 31 also for venting the front axle channel port 6. For this reason, the first redundancy relay valve working port 31.3 is connected to the front axle venting main valve 45, more precisely to a first front axle venting port 45.1. The front axle venting main valve 45 additionally has a second front axle venting port 45.2, which is connected to the front axle brake pressure line 70, and a front axle venting control port 45.3, which is connected to the second control line 69. The front axle venting main valve 45, like the rear axle venting main valve 46, is preferably in the open switching position shown in FIG. 2 in the pressureless state. Accordingly, if, for example, the electrical control unit ECU for the front axle valve assembly 10 or alternatively the rear axle valve assembly 12 fails, the front axle venting main valve 45 is opened, since a second front axle control pressure pVS2 is not controlled by the front axle outlet valve 24. A first front axle control pressure pVS1 is not controlled by the front axle inlet valve 22 either, so that a front axle brake pressure pVA cannot be controlled at the front axle channel port 6. At the same time, however, the first electro-pneumatic redundancy valve 30 is also in the first switching position shown in FIG. 2, so that the first redundancy pressure pR1 is controlled via the first redundancy control line 74 at the first redundancy relay valve 31. The open venting channel of the front axle channel port 6 can then be used for controlling the redundant front axle brake pressure pVAR, wherein it is then fed by the second compressed air supply 5.

The electro-pneumatic two-channel axle modulator 1 additionally has a first pressure sensor 61 and a second pressure sensor 63. The first pressure sensor 61 provides a front axle pressure signal SVD to the electronic control unit ECU, and the second pressure sensor 63 provides a rear axle pressure signal SHD to the electrical control unit ECU. For this purpose, the first pressure sensor 61 is connected via a first pressure measuring line 75 to the front axle brake pressure line 70, and the second pressure sensor 63 is connected via a second pressure measuring line 76 to the rear axle brake pressure line 73.

Figure 3:
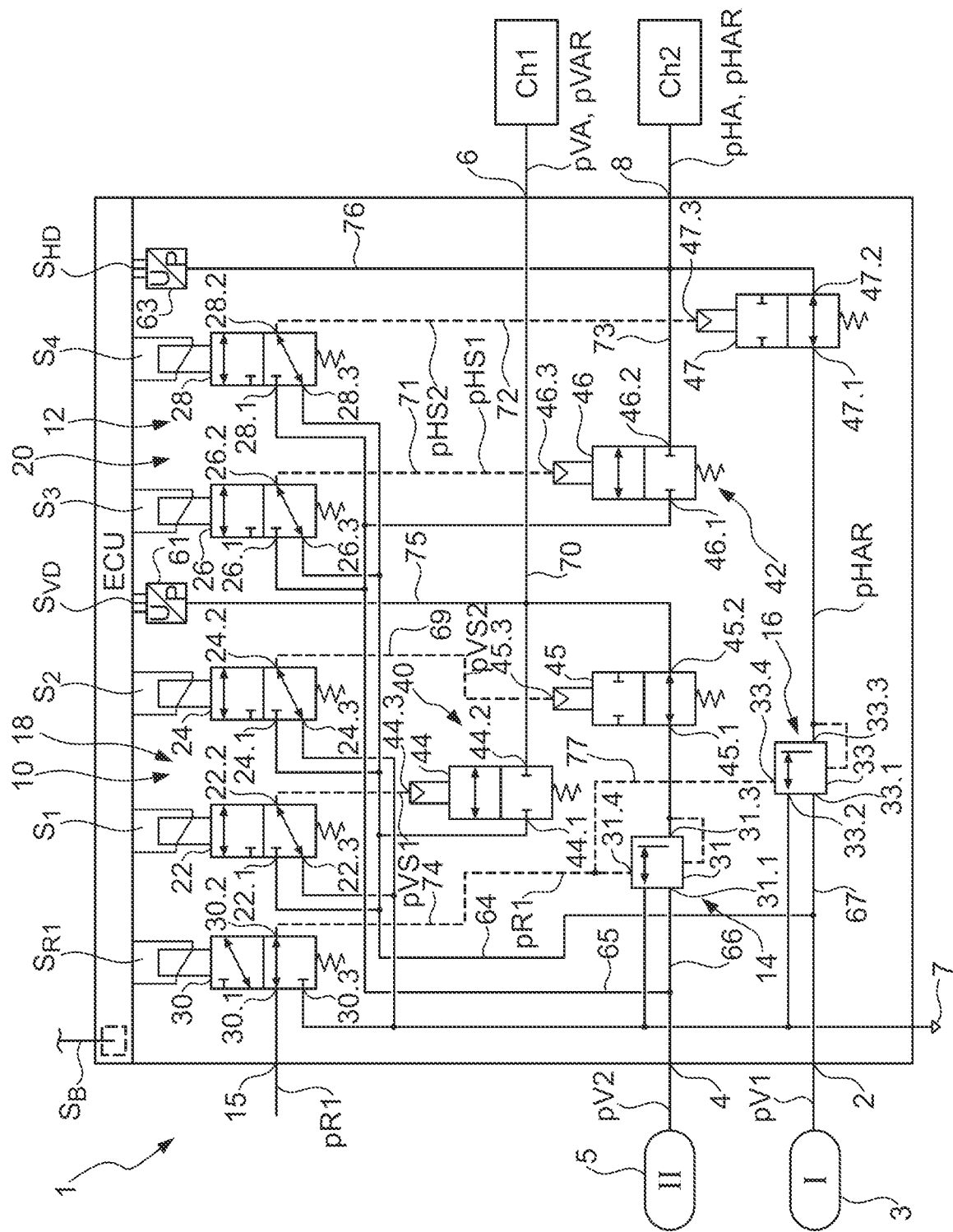
FIG. 3 shows a second exemplary embodiment of the electro-pneumatic two-channel axle modulator.

FIG. 3 shows a second exemplary embodiment of the electro-pneumatic two-channel axle modulator 1. The same and similar elements are provided with the same reference numerals hereinbelow, so that reference is made for these elements to the above statements in their entirety made in connection with the first exemplary embodiment (FIG. 2). The differences with respect to the first exemplary embodiment will in particular be discussed hereinbelow.

The main difference between the first exemplary embodiment (FIG. 2) and the second exemplary embodiment (FIG. 3) is that not only can the front axle brake pressure pVA be redundantly controlled by a redundant front axle brake pressure pVAR, but the rear axle brake pressure pHA can also be redundantly controlled as redundant rear axle brake pressure pHAR. In order to achieve this, the electro-pneumatic two-channel axle modulator 1 according to the second exemplary embodiment (FIG. 3) has a second redundancy valve assembly 16. This second redundancy valve assembly 16 receives the same first redundancy pressure pR1 which is provided via the first redundancy port 15 (here again the only redundancy port).

In this exemplary embodiment (FIG. 3), the second redundancy valve assembly 16 has a second redundancy relay valve 33 which is connected between the rear axle valve assembly 12 and the first supply port 2. The second redundancy relay valve 33 has a second redundancy relay valve supply port 33.1, a second redundancy relay valve venting port 33.2, a second redundancy relay valve working port 33.3 and a second redundancy relay valve control port 33.4. The second redundancy relay valve supply port 33.1 is connected to the fourth pneumatic line 67, as has in principle already been described in relation to FIG. 1. The fourth pneumatic line 67 is in turn connected to the first supply port 2, so that the first supply pressure pV1 is present at the second redundancy relay valve supply port 33.1. The second redundancy relay valve venting port 33.2 is connected to the vent 7. The second redundancy relay valve working port 33.3 is connected to the first rear axle venting port 47.1 of the rear axle venting main valve 47, that is to say to the venting path of the rear axle channel port 8.

The mode of functioning has already been described above in relation to the first redundancy relay valve 31. The second redundancy relay valve control port 33.4 is connected to a second redundancy control line 77, which in this exemplary embodiment (FIG. 3) branches from the first redundancy control line 74, so that the first redundancy pressure pR1 (the only redundancy pressure in this exemplary embodiment) is also present at the second redundancy relay valve control port 33.4. Consequently, in this exemplary embodiment (FIG. 3), both the redundant front axle brake pressure pVAR and the redundant rear axle brake pressure pHAR can be controlled at the respective front axle channel port 6 and rear axle channel port 8 in dependence on the first redundancy pressure pR1. The control of these pressures takes place crosswise, in other words the redundant front axle brake pressure pVAR is fed from the second supply port 4 and the redundant rear axle brake pressure pHAR is fed from the first supply port 2.

Figure 4:
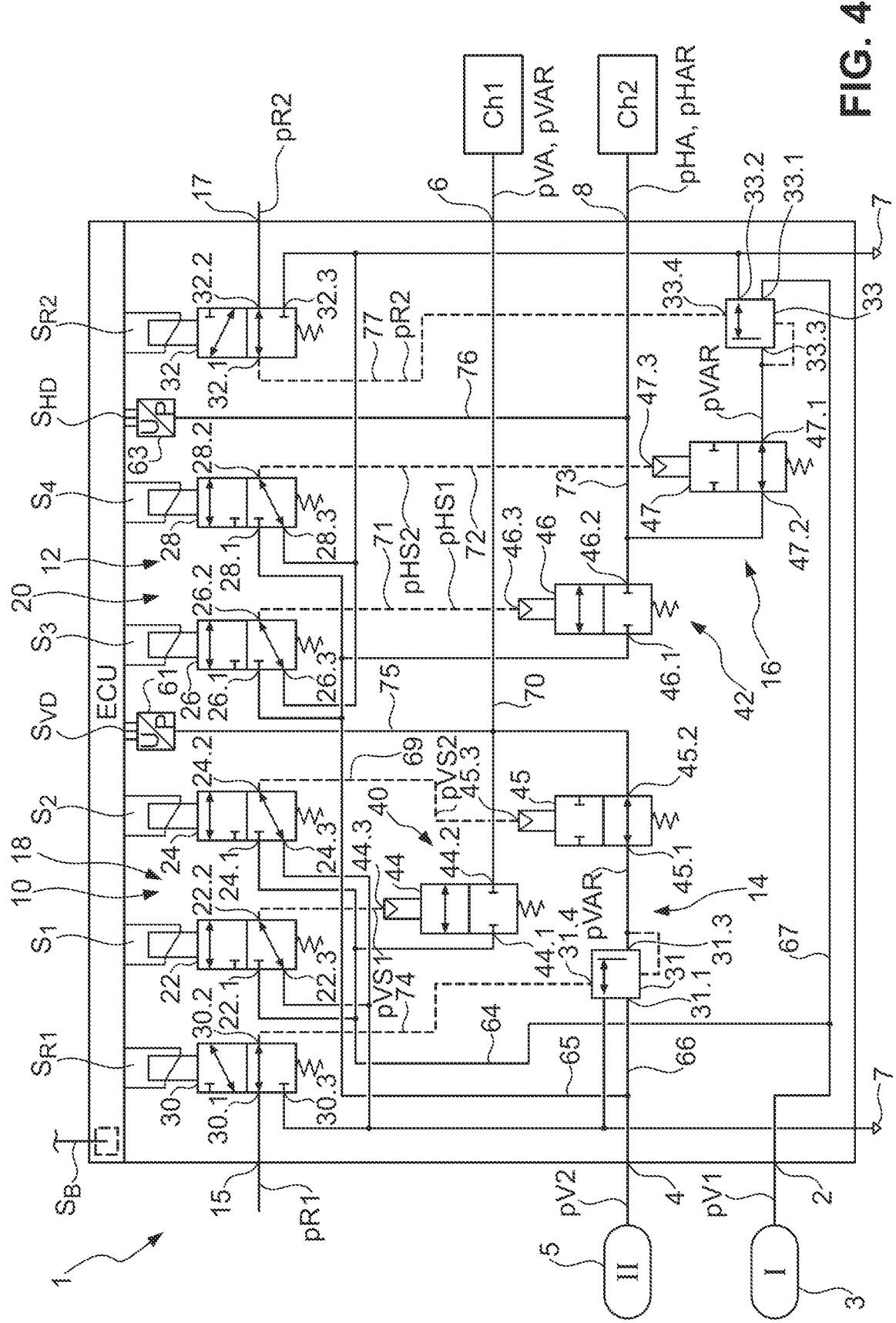
FIG. 4 shows a third exemplary embodiment of the electro-pneumatic two-channel axle modulator.

A third exemplary embodiment of the electro-pneumatic two-channel axle modulator 1 is shown in FIG. 4. The differences with respect to the second exemplary embodiment (FIG. 3) are again described in particular, and for the remaining elements, reference is made to the above description in its entirety relating to the first and second exemplary embodiments (FIGS. 2 and 3).

The main difference in the third exemplary embodiment (FIG. 4) is that a second redundancy port 17 is provided. A second redundancy pressure pR2 can be controlled at the second redundancy port 17, for example by means of a pneumatic brake value transmitter, such as, for example, a pneumatic brake pedal.

In this respect, the second redundancy valve assembly 16 in this exemplary embodiment (FIG. 4) also has a second electro-pneumatic redundancy valve 32, which corresponds in terms of its function to the first electro-pneumatic redundancy valve 30. The second electro-pneumatic redundancy valve 32 is configured as an electrically switchable 3/2-way valve and receives a second redundancy switching signal SR2 from the electronic control unit ECU. The second electro-pneumatic redundancy valve 32 has a fourth redundancy valve port 32.1, a fifth redundancy valve port 32.2 and a sixth redundancy valve port 32.3. The fourth redundancy valve port 32.1 is connected to the second redundancy port 17. The fifth redundancy valve port 32.2 is connected to a second redundancy control line 77, which here does not branch from the first redundancy control line 74 as in the second exemplary embodiment (FIG. 3), but is connected directly to the fifth redundancy valve port 32.2. Consequently, the second redundancy pressure pR2 can be controlled in the second redundancy control line 77. The sixth redundancy valve port 32.3 is connected to the vent 7. The second electro-pneumatic redundancy valve 32, in the currentless state, is again preferably in the first switching position shown in FIG. 4, in which the fourth redundancy valve port 32.1 is connected to the fifth redundancy valve port 32.2. In the energized state, the second electro-pneumatic redundancy valve 32 is preferably in the second switching position not shown in FIG. 4, in which the fifth redundancy valve port 32.2 is connected to the sixth redundancy valve port 32.3 and the second redundancy control line 77 is thus vented.

In this exemplary embodiment, the first and second redundancy pressure pR1, pR2 can thus be provided independently of one another, and a redundant front axle brake pressure pVAR and a redundant rear axle brake pressure pHAR can be controlled independently of one another.

Figure 5:
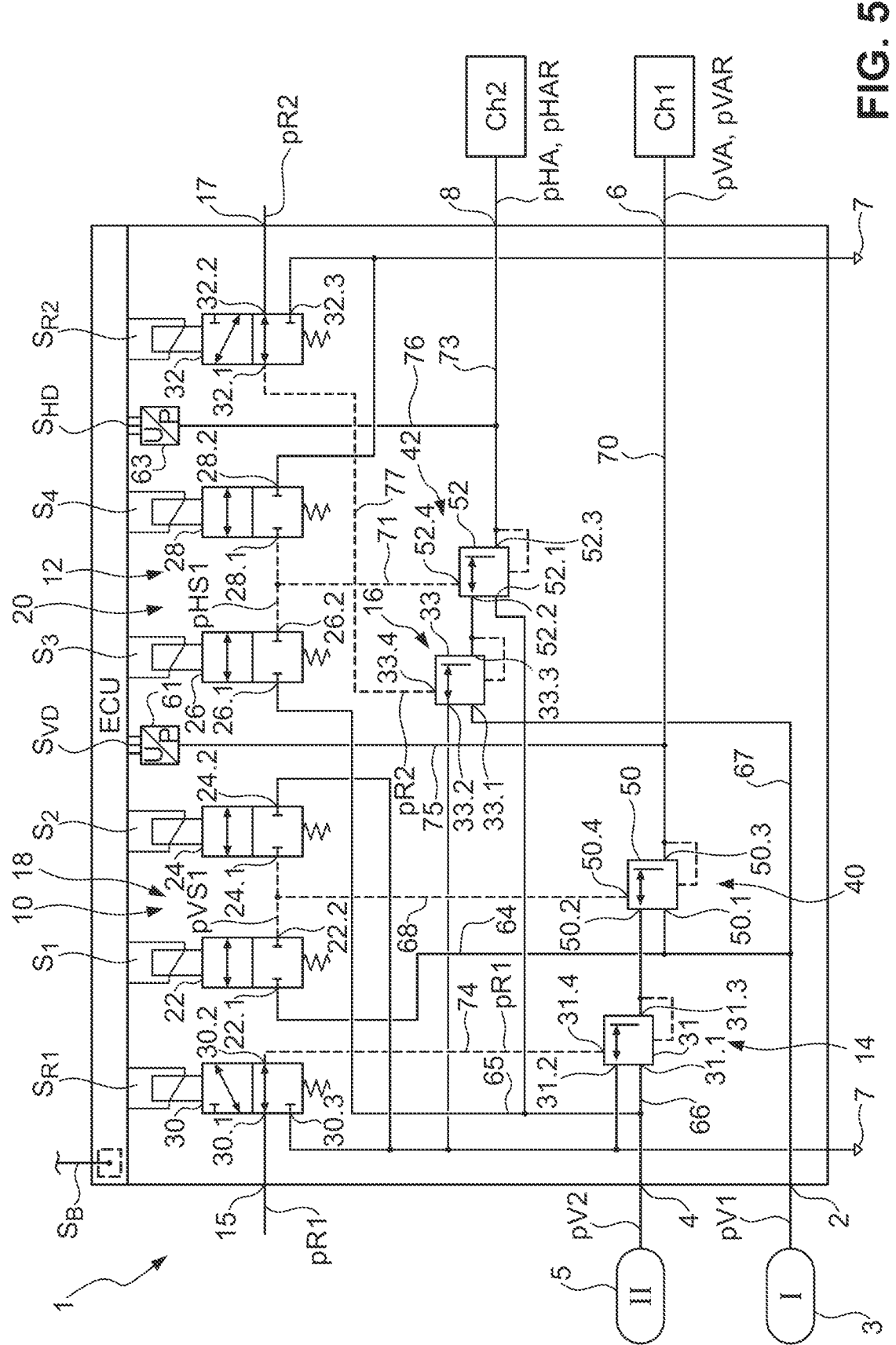
FIG. 5 shows a fourth exemplary embodiment of the electro-pneumatic two-channel axle modulator.

FIG. 5 shows a fourth exemplary embodiment of the electro-pneumatic two-channel axle modulator 1, and the same and similar elements are again provided with the same reference numerals; in this respect, reference is made to the above description in its entirety relating to the first three exemplary embodiments (FIGS. 2 to 4). The differences with respect to the third exemplary embodiment (FIG. 4) will again mainly be discussed hereinbelow.

The main difference in the fourth exemplary embodiment (FIG. 5) is that the pneumatic front axle main valve assembly 40 has a front axle relay valve 50, and the pneumatic rear axle main valve assembly 42 has a rear axle relay valve 52.

The front axle relay valve 50 has a front axle relay valve supply port 50.1, a front axle relay valve venting port 50.2, a front axle relay valve working port 50.3 and a front axle relay valve control port 50.4. The front axle relay valve supply port 50.1 is connected to the fourth pneumatic line 67, so that the first supply pressure pV1 is present at that port. The front axle relay valve venting port 50.2 is connected to the first redundancy relay valve working port 31.3, as has also been described with reference to the third exemplary embodiment (FIG. 4) in relation to the second front axle venting port 45.2. The front axle relay valve working port 50.3 is connected to the front axle brake pressure line 70. The front axle relay valve control port 50.4 is connected to the first control line 68, so that the first front axle control pressure pVS1 is present at that port. In this exemplary embodiment, there is only a single front axle control pressure, namely the first front axle control pressure pVS1. The reason for this is that not only the pneumatic front axle main valve assembly 40 but also the front axle pilot unit 18 is configured differently. In this exemplary embodiment (FIG. 5), the front axle inlet valve 22 and the front axle outlet valve 24 are configured as 2/2-way valves, since the control of two separate control pressures, as was necessary in the first exemplary embodiments (FIGS. 2 to 4) in order to control the two pneumatically switched valves of the main valve unit, is not required.

In this respect, the front axle inlet valve 22 in this exemplary embodiment (FIG. 5) has only a first front axle inlet valve port 22.1 and a second front axle inlet valve port 22.2, wherein the first front axle inlet valve port 22.1 is connected to the first pneumatic line 64, as has in principle already been described above. The second front axle inlet valve port 22.2 is connected to the first control line 68, as has likewise already been described above. In order to vent the first control line 68, the front axle outlet valve 24 is likewise configured as a 2/2-way valve and has a first front axle outlet valve port 24.1 and a second front axle outlet valve port 24.2. The first front axle outlet valve port 24.1 is connected to the vent, while the second front axle outlet valve port 24.2 is connected to the first control line 68 in order to vent it. In this manner, the first front axle control pressure pVS1 can be correspondingly set and controlled at the front axle relay valve control port 50.4.

In a corresponding manner, the rear axle relay valve 52 has a rear axle relay valve supply port 52.1, a rear axle relay valve venting port 52.2, a rear axle relay valve working port 52.3 and a rear axle relay valve control port 52.4. The rear axle relay valve supply port 52.1 is connected to the second pneumatic line 65, so that the second supply pressure pV2 is present at that port. The rear axle relay valve venting port 52.2 is connected to the second redundancy relay valve working port 33.3, as has in principle already been described above in relation to the first rear axle venting port 47.1 (see FIG. 3). The rear axle relay valve working port 52.3 is connected to the rear axle brake pressure line 73. The rear axle relay valve control port 52.4 is connected to the third control line 71. Again, the rear axle relay valve 52 requires only a single control pressure, namely the first rear axle control pressure pHS1, as has in principle already been described in relation to the front axle relay valve 50. In this respect, the rear axle pilot unit 20 is also configured differently to the first exemplary embodiments, namely in that the rear axle inlet valve 26 is configured as a 2/2-way valve and the rear axle outlet valve 28 is likewise configured as a 2/2-way valve. The rear axle inlet valve 26 has the first rear axle inlet valve port 26.1 and the second rear axle inlet valve port 26.2, wherein the first rear axle inlet valve port 26.1 is connected to the second pneumatic line 65, as has already been described above. In this respect, the second supply pressure pV2 is present at the first rear axle inlet valve port 26.1. The second rear axle inlet valve port 26.2 is connected to the third control line 71 and controls the first rear axle control pressure pHS1 into that line. For venting the third control line 71, that control line is connected to the rear axle outlet valve 28, more precisely to the second rear axle outlet valve port 28.2. The first rear axle outlet valve port 28.1 is connected to the vent 7.

Figure 6:
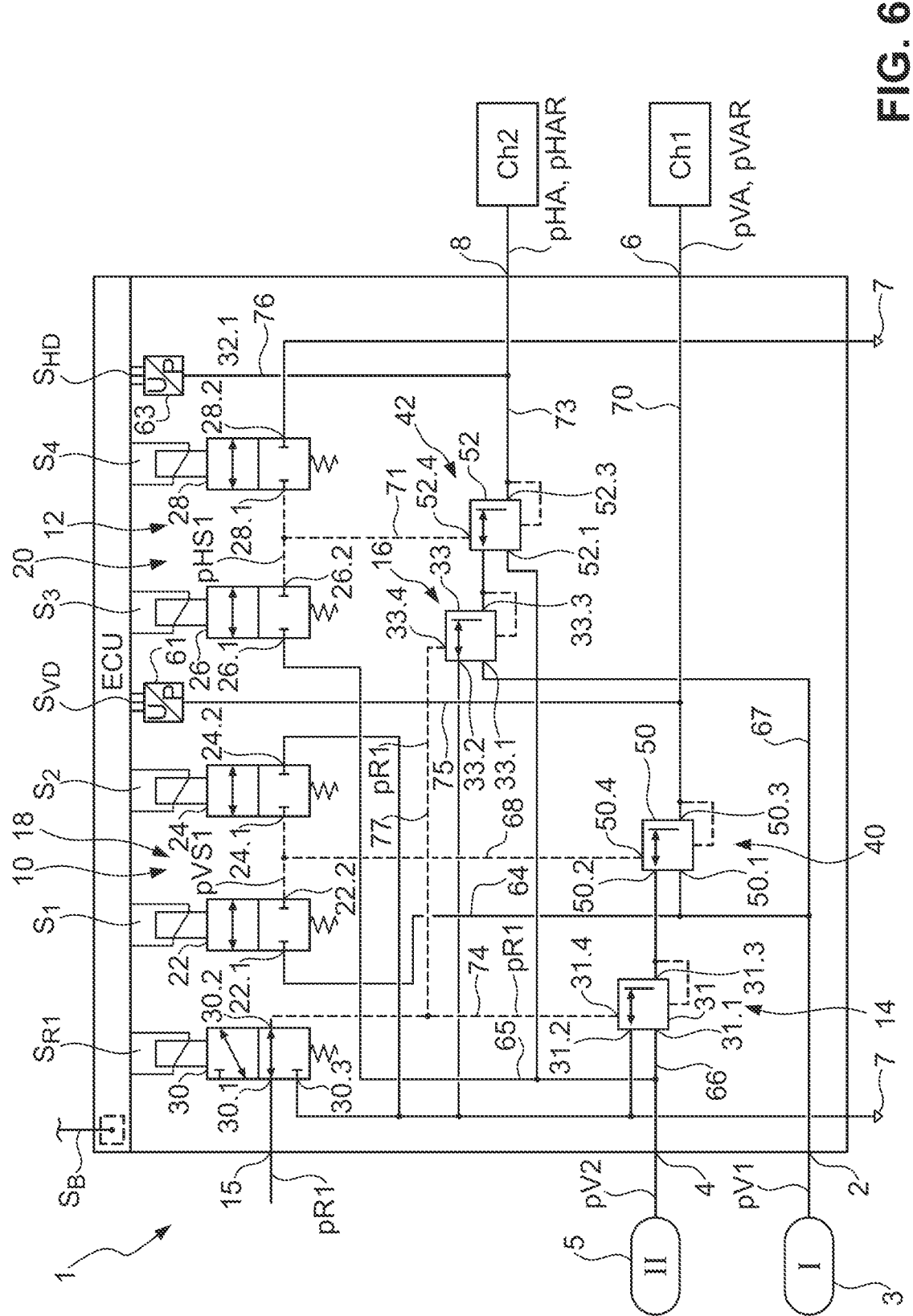
FIG. 6 shows a fifth exemplary embodiment of the electro-pneumatic two-channel axle modulator.

The fifth exemplary embodiment (FIG. 6) is based in principle on the fourth exemplary embodiment (FIG. 5) but differs therefrom in that only a single redundancy port 15 is again provided, as has in principle already been described in relation to the first and the second exemplary embodiment (FIGS. 2 and 3).

In this respect, the second redundancy control line 77 is again configured as a branch line from the first redundancy control line 74, so that the first redundancy pressure pR1 is also present at the second redundancy relay valve control port 33.4.

The remaining elements are identical to the preceding exemplary embodiment (FIG. 5).

While the above description constitutes the preferred embodiments of the present invention, the invention is susceptible to modification, variation and change without departing from the proper scope and fair meaning of the accompanying claims.

The invention claimed is:

1. An electro-pneumatic two-channel axle modulator (1) for utility vehicles, comprising:
 a first supply port (2) for connecting a first compressed air supply (3) and a second supply port (4) for connecting a second compressed air supply (5);
 a front axle channel port (6);
 a rear axle channel port (8);
 an electro-pneumatic front axle valve assembly (10) connected to the first supply port (2) for controlling a front axle brake pressure (pVA) at the front axle channel port (6);
 an electro-pneumatic rear axle valve assembly (12) connected to the second supply port (4) for controlling a rear axle brake pressure (pHA) at the rear axle channel port (8); and
 a first redundancy valve assembly (14) connected to the second supply port (4) for controlling a redundant front axle brake pressure (pVAR) at the front axle channel port (6).

2. The electro-pneumatic two-channel axle modulator (1) as claimed in claim 1, further comprising a second redundancy valve assembly (16) connected to the first supply port (2) for controlling a redundant rear axle brake pressure (pHAR) at the rear axle channel port (8).

3. The electro-pneumatic two-channel axle modulator (1) as claimed in claim 1, further comprising a first redundancy port (15) for receiving a first redundancy pressure (pR1) connected to the first redundancy valve assembly (14).

4. The electro-pneumatic two-channel axle modulator (1) as claimed in claim 2, further comprising a second redundancy port (17) for receiving a second redundancy pressure (pR2) connected to the second redundancy valve assembly (16).

5. The electro-pneumatic two-channel axle modulator (1) as claimed in claim 1, wherein
 the electro-pneumatic front axle valve assembly (10) has a front axle pilot unit (18) having a front axle inlet valve (22) for controlling a first front axle control pressure (pVS1), and a front axle outlet valve (24), and
 the electro-pneumatic rear axle valve assembly (12) has a rear axle pilot unit (20) having a rear axle inlet valve (26) for controlling a first rear axle control pressure (pHS1), and a rear axle outlet valve (28).

6. The electro-pneumatic two-channel axle modulator (1) as claimed in claim 3, wherein the first redundancy valve assembly (14) has a first electro-pneumatic redundancy valve (30) connected to the first redundancy port (15), and a first redundancy relay valve (31).

7. The electro-pneumatic two-channel axle modulator (1) as claimed in claim 2, wherein the second redundancy valve assembly (16) has a second redundancy relay valve (33).

8. The electro-pneumatic two-channel axle modulator (1) as claimed in claim 4, wherein the second redundancy valve assembly (16) has a second electro-pneumatic redundancy valve (32) connected to the second redundancy port (17).

9. The electro-pneumatic two-channel axle modulator (1) as claimed in claim 6, wherein the first redundancy relay valve (31) has a first redundancy relay valve supply port (31.1) connected to the second supply port (4), a first redundancy relay valve venting port (31.2) connected to a vent (7), a first redundancy relay valve working port (31.3) connectable to the front axle channel port (6), and a first redundancy relay valve control port (31.4) connected to the first electro-pneumatic redundancy valve (30).

10. The electro-pneumatic two-channel axle modulator (1) as claimed in claim 8, wherein the second redundancy relay valve (33) has a second redundancy relay valve supply port (33.1) connected to the first supply port (2), a second redundancy relay valve venting port (33.2) connected to a vent (7), a second redundancy relay valve working port (33.3) connectable to the rear axle channel port (8), and a second redundancy relay valve control port (33.4) connected to a first electro-pneumatic redundancy valve (30) or the second electro-pneumatic redundancy valve (32).

11. The electro-pneumatic two-channel axle modulator (1) as claimed in claim 5,
wherein the electro-pneumatic front axle valve assembly (10) has a pneumatic front axle main valve assembly (40) connected to the first supply port (2) and receiving the first front axle control pressure (pVS1) and is configured, in response to receiving the first front axle control pressure (pVS1), to control the front axle brake pressure (pVA) at the front axle channel port (6), and
wherein the electro-pneumatic rear axle valve assembly (12) has a pneumatic rear axle main valve assembly (42) connected to the second supply port (4) and receiving the first rear axle control pressure (pHS1) and is configured, in response to receiving the first rear axle control pressure (pHS1), to control the rear axle brake pressure (pHA) at the rear axle channel port (8).

12. The electro-pneumatic two-channel axle modulator (1) as claimed in claim 11, wherein the front axle main valve assembly (40) is connected to a first redundancy relay valve (31) for venting the front axle channel port (6).

13. The electro-pneumatic two-channel axle modulator (1) as claimed in claim 11, wherein the rear axle main valve assembly (42) is connected to a second redundancy relay valve (33) for venting the rear axle channel port (8).

14. The electro-pneumatic two-channel axle modulator (1) as claimed in claim 11, wherein the pneumatic front axle main valve assembly (40) has
a front axle air admission main valve (44) connected to the first supply port (2) and the front axle channel port (6), and
a front axle venting main valve (45) connectable to a vent (7) and connected to the front axle channel port (6).

15. The electro-pneumatic two-channel axle modulator (1) as claimed in claim 11, wherein the pneumatic rear axle main valve assembly (42) has
a rear axle air admission main valve (46) connected to the second supply port (4) and the rear axle channel port (8), and
a rear axle venting main valve (47) connected or connectable to a vent (7) and connected to the rear axle channel port (8).

16. The electro-pneumatic two-channel axle modulator (1) as claimed in claim 14, wherein the front axle venting main valve (45) is connected to a first redundancy relay valve working port (31.3).

17. The electro-pneumatic two-channel axle modulator (1) as claimed in claim 15, wherein the rear axle venting main valve (47) is connected to a second redundancy relay valve working port (33.3).

18. The electro-pneumatic two-channel axle modulator (1) as claimed in claim 11, wherein the pneumatic front axle main valve assembly (40) has a front axle relay valve (50), and the pneumatic rear axle main valve assembly (42) has a rear axle relay valve (52).

19. The electro-pneumatic two-channel axle modulator (1) as claimed in claim 18, wherein the front axle relay valve (50) has a front axle relay valve supply port (50.1) connected to the first supply port (2), a front axle relay valve venting port (50.2) connected to a first redundancy relay valve working port (31.3), a front axle relay valve working port (50.3) connected to the front axle channel port (6), and a front axle relay valve control port (50.4) connected to the front axle pilot unit (18).

20. The electro-pneumatic two-channel axle modulator (1) as claimed in claim 18, wherein the rear axle relay valve (52) has a rear axle relay valve supply port (52.1) connected to the second supply port (4), a rear axle relay valve venting port (52.2) connected to a second redundancy relay valve working port (33.3), a rear axle relay valve working port (52.3) connected to the rear axle channel port (8), and a rear axle relay valve control port (52.4) connected to the rear axle pilot unit (20).

21. The electro-pneumatic two-channel axle modulator (1) as claimed in claim 9, wherein the first electro-pneumatic redundancy valve (30) has a first redundancy valve port (30.1) connected to the first redundancy port (15), a second redundancy valve port (30.2) connected to the first redundancy relay valve control port (31.4), and a third redundancy valve port (30.3) connected to a vent (7).

22. The electro-pneumatic two-channel axle modulator (1) as claimed in claim 21, wherein the second redundancy valve port (30.2) is also connected to a second redundancy relay valve control port (33.4).

23. The electro-pneumatic two-channel axle modulator (1) as claimed in claim 10, wherein the second electro-pneumatic redundancy valve (32) has a fourth redundancy valve port (32.1) connected to the second redundancy port (17), a fifth redundancy valve port (32.2) connected to the second redundancy relay valve control port (33.4), and a sixth redundancy valve port (33.3) connected to a vent (7).

24. The electro-pneumatic two-channel axle modulator (1) as claimed in claim 1, further comprising an electrical control unit (ECU) having an electrical terminal for receiving brake signals (SB) and for providing corresponding switching signals (S1, S2, S3, S4) at least to the electro-pneumatic front axle valve assembly (10) and the electro-pneumatic rear axle valve assembly (12).

25. The electro-pneumatic two-channel axle modulator (1) as claimed in claim 1, further comprising a first pressure sensor (61) for detecting the front axle brake pressure (pVA) and providing a corresponding front axle pressure signal (SVD), and a second pressure sensor (63) for detecting the rear axle brake pressure (pHA) and providing a corresponding rear axle pressure signal (SHD).

* * * * *